United States Patent
Lee

(10) Patent No.: US 8,731,621 B2
(45) Date of Patent: May 20, 2014

(54) METHOD FOR EXECUTING APPLICATION DURING CALL AND MOBILE TERMINAL SUPPORTING THE SAME

(75) Inventor: Kyungryol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/550,888

(22) Filed: Jul. 17, 2012

(65) Prior Publication Data

US 2013/0023248 A1     Jan. 24, 2013

(30) Foreign Application Priority Data

Jul. 18, 2011  (KR) .................. 10-2011-0070797

(51) Int. Cl.
*H04M 1/00* (2006.01)

(52) U.S. Cl.
USPC .............. 455/569.1; 455/414.1; 455/414.3; 455/416; 455/566

(58) Field of Classification Search
USPC ........ 455/412.1–414.1, 418–420, 556.2, 563, 455/566–569.1; 345/156–183
See application file for complete search history.

(56) References Cited

U.S. PATENT DOCUMENTS

| | | | |
|---|---|---|---|
| 2008/0158334 A1* | 7/2008 | Reponen et al. | 348/14.02 |
| 2009/0298533 A1* | 12/2009 | Alameh et al. | 455/556.1 |
| 2010/0029270 A1* | 2/2010 | Kiddie et al. | 455/428 |
| 2010/0041431 A1* | 2/2010 | Kim et al. | 455/550.1 |
| 2010/0111071 A1* | 5/2010 | Khare | 370/352 |
| 2010/0159998 A1* | 6/2010 | Luke et al. | 455/567 |
| 2010/0203877 A1* | 8/2010 | Yamashita et al. | 455/418 |
| 2011/0003585 A1* | 1/2011 | Wang et al. | 455/418 |
| 2011/0137548 A1* | 6/2011 | Shen et al. | 701/201 |
| 2012/0064922 A1* | 3/2012 | Podoloff et al. | 455/456.6 |
| 2012/0108221 A1* | 5/2012 | Thomas et al. | 455/415 |
| 2012/0178405 A1* | 7/2012 | Sieg et al. | 455/404.1 |
| 2012/0218177 A1* | 8/2012 | Pang et al. | 345/156 |
| 2012/0249797 A1* | 10/2012 | Haddick et al. | 348/158 |

* cited by examiner

*Primary Examiner* — Dai A Phuong

(74) *Attorney, Agent, or Firm* — Jefferson IP Law, LLP

(57) ABSTRACT

A method and a mobile terminal for executing application during a call and a mobile terminal supporting the same are provided. The method for executing application during a call includes determining whether an orientation state of a mobile terminal is changed after forming a call channel and when the orientation state of the mobile terminal is determined to be changed, executing a preset application. The method and mobile terminal for executing an application during a call can momentarily execute a specific application when desired by the user.

9 Claims, 4 Drawing Sheets

METHOD FOR EXECUTING APPLICATION DURING CALL AND MOBILE TERMINAL SUPPORTING THE SAME

PRIORITY

This application claims the benefit under 35 U.S.C. §119(a) to Korean patent application filed in the Korean Intellectual Property Office on Jul. 18, 2011 and assigned Serial No. 10-2011-0070797, the entire disclosure of which is hereby incorporated by reference.

BACKGROUND OF THE INVENTION

1. Field of the Invention

The present invention relates to a mobile terminal supporting a call function. More particularly, the present invention relates to a method of executing a particular application during a call and a mobile terminal supporting the same.

2. Description of the Related Art

A mobile terminal according to the related art provides various functions in addition to a call function. For example, the mobile terminal supports functions associated with a memo, a phonebook, a calendar, a text message, an electronic mail (e-mail), a camera, a web browser, multimedia playback, and the like. Accordingly, a user of the mobile terminal can enjoy a variety of services specific to a need.

Moreover, the mobile terminal can support a multitask process. Therefore, the user can use another function as needed, during a call. For instance, during the call, the user can take a memo of the conversation, check schedules to set an appointment, view a text message received during the call, send an e-mail attaching a photo or other file requested by another party of the call, and the like. Therefore, the user can control the mobile terminal to call another function while maintaining a call.

However, when the user executes another function during a call, many complicated steps are required. Thus, another party to the call needs to wait a long time while the user tries to execute other functions. For example, in order to execute a function during a call, the user needs to first, move and orient the mobile terminal to a position for viewing a display screen, call a main menu of the mobile terminal using a touch screen or function keys from the display view of the call, then at the main menu, find an icon of the desirable application for execution. Therefore, in order for the user to use a particular function during a call using a mobile terminal according to the related art, it is inevitable that the user must go through tedious and cumbersome procedures to execute a desired function.

In addition, the mobile terminal according to the related art displays a number of icons to provide a variety of applications. As such, the greater the number of icons, the longer the search time for the user to identify a desirable icon. Further, a considerable effort is required for the user to execute a desirable application, because the user needs to memorize and search a location of the icon of the application. Once locating the icon, the user needs to follow through a series of procedural steps execute the application and finally use a desirable function.

As described above, the user of the mobile terminal according to the related art experiences inconveniences in using a particular function while on a call.

Therefore, a need exists for an apparatus and a method for executing an application during a call that enables a user to momentarily use a particular program in case needed.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for executing an application during a call that enables a user to momentarily use a particular program in case needed.

Another aspect of the present invention is to provide a method for executing an application during a call that enables a user to use a desired application without a need to select or input commands during the call.

In accordance with an aspect of the present invention, a method for executing an application during a call is provided. The method includes determining whether an orientation state of a mobile terminal is changed after forming a call channel and when the orientation state of the mobile terminal is determined to be changed, automatically executing a preset application.

In accordance with another aspect of the present invention, a mobile terminal for supporting an execution of an application during a call is provided. The mobile terminal includes a wireless communication unit configured to form a call channel, a sensing unit configured to generate sensing information in accordance with a change in an orientation state of the mobile terminal while the call channel is formed, a control unit configured to automatically execute a preset application when the orientation state of the mobile terminal is determined to be changed by analyzing the sensing information, once the communication generation is formed, and a display unit configured to display a screen for the preset application being executed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

This invention may, however, be embodied in many different forms and should not be construed as limited to the exemplary embodiments set forth herein. Rather, the disclosed exemplary embodiments are provided so that this disclosure will be thorough and complete, and will fully convey the scope of the invention to those skilled in the art. The principles and features of this invention may be employed in varied and numerous embodiments without departing from the scope of the invention. Further, detailed descriptions of well-known functions and structures incorporated herein may be omitted to avoid obscuring the subject matter of the present invention.

A mobile terminal according to exemplary embodiments of the present invention may include various information and communication devices, multi-media devices, and application devices thereof such as a digital broadcasting player, a Personal Digital Assistant (PDA), a Smart Phone, a tablet PC, a hand-held PC, as well as various mobile communication terminals operating based on communication protocols corresponding to various communication systems.

Figure 1:
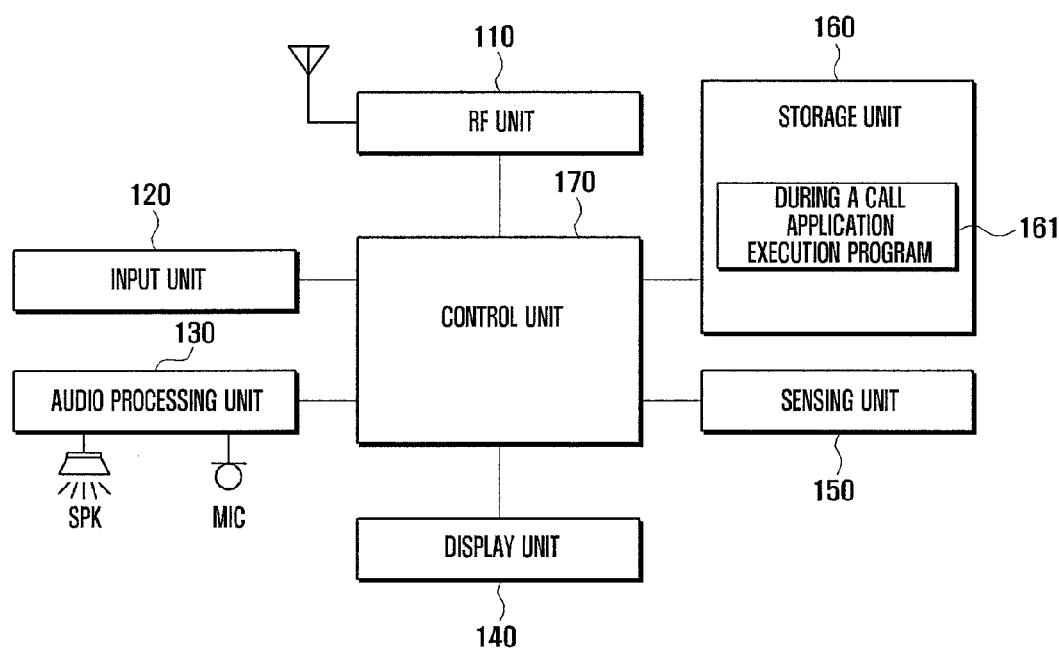
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention. As an example, the mobile terminal in accordance with the exemplary embodiment of the present invention to be described below can be a smartphone or a tablet computer that supports not only the call function but also additional software functions.

Referring to FIG. 1, the mobile terminal 100 in the exemplary embodiment of the present invention comprises a Radio Frequency (RF) unit 110, an input unit 120, an audio processing unit 130, a display unit 140, a sensing unit 150, a storage unit 160, and a control unit 170. The mobile terminal 100 equipped with such functional units can enable a particular application to be executed by detecting a change in an orientation state of the mobile terminal 100 while a call channel is formed. Detailed description about each of the functional units is explained below.

The RF unit 110 under the control of the control unit 170, provides communication channels for a voice call, a video call, and transmission of data, such as, for example, an image or a message. For example, the RF unit 110 provides a voice call channel, a data communication channel, and a video call channel between mobile communication systems. A user function utilizing the wireless communication unit (e.g., RF unit 110) may be selected and activated through a touch event occurring on a particular icon or key map displayed on the mobile terminal 100. According to exemplary embodiments of the present invention, the RF unit 110 can be operated to support a call function by maintaining the call channel while a particular user function is being executed.

The input unit 120 receives input of numeral and character information as well as information for setting various functions, and transmits the input information to the control unit 170. The input unit 120 may include at least one of numeral keys, character keys, directional keys set to perform specific functions, function keys such as side keys and shortcut keys, a touch pad, and the like. In particular, the input unit 120 further comprises a voice call key. Therefore, in accordance with an input of the voice call key, the RF unit 110 can form a voice call channel. In addition, the input unit 120 can further include a video call key if the mobile terminal 100 comprises a camera unit (not illustrated in FIG. 1) for a video call. Thus, the input unit 120 enables a video call channel to be formed by operating with the RF unit 110. Moreover, the input unit 120 can generate an input signal for setting an application to be automatically executed during a call.

The audio processing unit 130 generates an audio signal output from an audio CODEC through a Speaker (SPK), and transmits an audio signal input, such as, for example, a user's voice, through a Microphone (MIC) to the audio CODEC. In particular, in a speaker phone mode, the Speaker (SPK) can output an analog voice signal converted from a digital voice signal received from a call channel. In addition, the Microphone (MIC) can be internal or external to the mobile terminal 100. If the Microphone (MIC) is external to the mobile terminal 100, then the microphone can be connected to the mobile terminal 100 via a microphone jack of the mobile terminal 100. As an example, the microphone jack can be integrated with an earphone jack. Moreover, the audio processing unit 130 can output, when a particular application is executed as a result of a change in an orientation state of the mobile terminal 100 during a call, guide information about the particular program such as a name of the application or a name of a default function, and the like as a voice signal.

The display unit 140 displays information entered by a user while using the mobile terminal 100 or information provided to the user as a variety of screens. Specifically, the display unit 140 displays, when establishing a call channel, a screen for a call connection indicating a state thereof. In addition, when a particular application is executed during a call, the display unit 140 displays an execution screen of the application including symbols, texts, or the like indicating the call connection. For example, when a memo application is automatically executed during a call, a screen for composing a memo can be displayed and a symbol representing a telephone can be displayed in an indicator area. In addition, the display unit 140 can overlay and display a message notifying an initiation of an execution of an application, a pop up window which checks whether or not to execute an additional application, and the like on the execution screen. For example, when an additional application, such as a voice recording application is simultaneously executed, the display unit 140 can additionally display an execution screen for the voice recording as a part of the execution screen of the memo application.

The sensing unit 150 is configured to collect sensing information resulting from a change in an orientation state of the mobile terminal 100 to which a call channel is established. The sensing unit 150 can include a variety of sensors. For example, the sensing unit 150 can comprise at least one of an illuminance sensor and proximity sensor for detecting a state when the mobile terminal 100 is detached from a user (e.g., user's face) after being in contact, during a call—i.e., proximity state of the mobile terminal 100 in relation to a user—, an accelerometer and gyro sensor for sensing a movement direction and speed, a tilt sensor for detecting an angle of orientation of the mobile terminal 100, and the like. If the sensing unit 150 comprises a plurality of the above-mentioned sensors, at least one of the plurality of sensors can be, either independently or collectively, activated in response to a request signal from the control unit 170. For example, in the sensing unit 150, an illuminance sensor and accelerometer can be activated at the same time in accordance with a control of the control unit 170, and a tilt sensor and gyro sensor can be simultaneously activated under a control of the control unit 170.

A sensing information collecting frequency corresponding to each of at least one sensor in the sensing unit 150 can be determined by a request signal transmitted from the control unit 170. For example, the sensing information collecting frequency can be decided based on a particular time point, a frequency, and the like when the control unit 170 requests such information according to a content of the request signal. In particular, the sensing unit 150 starts to collect sensing information from at least one sensor when a call channel is established in the mobile terminal 100 under a control of the control unit 170. Accordingly, the sensing unit 150 can collect sensing information about a change in an orientation state of the mobile terminal 100 during a call.

The storage unit 160 stores at least one application needed for an operation of a function, user data generated by a user, message for transmitted or received with a network, and data resulting from an execution of an application, and the like. For example, the storage unit 160 can be divided as a program area and data area.

The program storage area stores an Operating System (OS) for booting the mobile terminal 100 and for controlling the components in the mobile terminal 100, applications downloaded from the network, and the like. The program storage area stores a call application for supporting a call function, a memo application for composing and storing a memo, a phonebook application for managing contacts, a calendar application for managing schedules, an e-mail application, a messaging application for receiving and transmitting data, a camera application for capturing a picture and for generating a digital image, and the like. According to exemplary embodiments of the present invention, the program area further stores a during-a-call application execution program 161.

The during-a-call application execution program 161 enables determining whether an orientation state of the mobile terminal 100, while a call channel is established, is changed, automatically executing, when a change in the orientation state of the mobile terminal 100 has occurred, a particular application, and displaying a screen for the particular application being executed. In addition, the during-a-call application execution program 161 enables the particular application to be terminated when a change in the orientation state of the mobile terminal 100 is detected during an execution of the particular application. On the other hand, the during-a-call application execution program 161 can enable the on-going function to be continuously operated without terminating the automatically executed application, even if the orientation of the mobile terminal 100 changes.

In accordance with another exemplary embodiment of the present invention, the during-a-call application execution program 161 additionally enables a voice signal of a user during a call (e.g., a voice signal of conversation) to be voice-recognized at the time point of detecting a change in the orientation state of the mobile terminal 100. Then, the during-a-call application execution program 161 can identify an application corresponding to the voice-recognized voice signal and can enable an automatic execution of the identified application along with the call function.

The data area is an area for storing data occurring as a result of the mobile terminal 100 being used. Specifically, the data area stores information used or generated during an execution of the during-a-call application execution program 161. For example, the data area can include an on/off setting for during-a-call application execution, sensing information associated with detection of a change in an orientation state, and a list for applications executable during a call (hereinafter, the application list). The application list lists an identifier of at least one application. For example, the application list can include identifiers for distinguishing a memo application, a phonebook application, a calendar application, a messaging application, an e-mail application, a camera application, and the like. Also, the application list can display a default application. Moreover, the application list can display a user preference for the applications in the list.

Further, the data area may optionally store mapping information of additional application. The additional application is an application that can be simultaneously executed with at least one of the applications in the application list. For example, such additional application can supplement a limitation resulted by a particular application in the application list being simultaneously executed with a call function.

In accordance with another exemplary embodiment of the present invention, the data area can further store an on/off setting for a voice recognition during a call, mapping information of an application and an execution command, and a stack. The application and execution command mapping information includes at least one execution command for each of the application identifier. Thus, exemplary embodiments of the present invention can execute an application mapped to an execution command voice-recognized from a conversation during a call. As an example, the stack continuously and temporarily stores a constant amount of a user voice signal generated during a call. The stack, under a control of the control unit 170 temporarily stores a limited amount of voice data received from the Microphone (MIC) once a call channel is established, in a First-In, First-Out (FIFO) order. Therefore, the stack can continuously store a constant amount of the most recent conversation when storing the voice signal during a call.

The control unit 170 operatively controls the entire operation of the mobile terminal 100. The control unit 170 operatively controls the operations related to during-a-call application execution program 161. For example, the control unit 170 enables a call channel to be established by controlling the RF unit 110 in accordance with an input received from the input unit 120. In addition, the control unit 170 receives and analyzes sensing information from the sensing unit 150 and then determines whether an orientation state of the mobile terminal 100 is changed. Moreover, when it is determined that the orientation state of the mobile terminal 100 is changed, the control unit 170 enables a preset application to be automatically executed. During this process, if a change in the orientation state of the mobile terminal 100 is detected during the execution of the application, the control unit 170 can terminate the application. On the other hand, the control unit 170 can enable the application to remain in an active state even if the call is dropped.

In accordance with another exemplary embodiment of the present invention, when the control unit 170 determines that an orientation state of the mobile terminal 100 is changed, the control unit 170 can additionally access the storage unit 160. Then, the control unit 170 enables a voice recognition of a voice signal of the user during a call and identifies an application corresponding to the voice-recognized voice signal. Then, the control unit 170 enables an automatic execution of the identified application.

Figure 2:
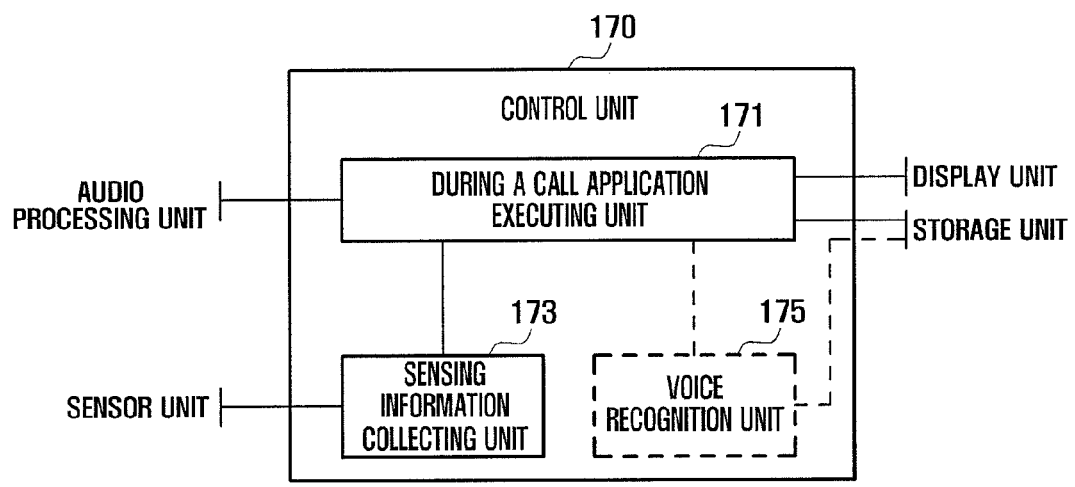
FIG. 2 is a block diagram illustrating a detailed configuration of a control unit according to an exemplary embodiment of the present invention such as, for example, the control unit of FIG. 1.

To this end, the control unit 170 can include functional units as illustrated in FIG. 2.

FIG. 2 is a block diagram illustrating a detailed configuration of a control unit according to an exemplary embodiment of the present invention such as, for example, the control unit of FIG. 1.

Referring to FIG. 2, the control unit 170 includes a during-a-call application executing unit 171 (hereinafter, the application executing unit 171) and a sensing information collecting unit 173. In addition, the control unit 170 can further include a voice recognition unit 175.

According to exemplary embodiments of the present invention, the application executing unit 171 determines whether an orientation state of the mobile terminal 100 is changed when a voice or video call channel is established and enables an automatic execution of a preset application when the orientation state of the mobile terminal 100 is determined to be changed. Specifically, when a particular call channel is determined to be established, the application execution unit 171 can determine whether an execution of an application during a call is set or not. In addition, the application executing unit 171 determines whether an orientation state of the mobile terminal 100 is changed. During this process, the application executing unit 171 requires sensing information from the sensing information collecting unit 173. Then, the application executing unit 171 analyzes the received sensing information and determines whether the orientation state of the mobile terminal 100 is changed. During this process, the application executing unit 171 decides a preset state according to a call type and determines whether the orientation state of the mobile terminal 100 is changed. A detailed description about the determining of a change in the orientation state of the mobile terminal 100 based on a call type is explained in detail below.

When the orientation state of the mobile terminal 100 is determined to be changed, the application executing unit 171 enables a particular application to be executed. During this process, it is preferred that the application executing unit 171 outputs a screen of the particular application being executed by controlling the display unit 140. The application being executed can be a default application, an application indicated as the most preferred, or a preset application configured to be executing during a call by a user.

In addition, the application executing unit 171 can support the executed application to be terminated. Specifically, once the application executing unit 171 determines that an orientation state of the mobile terminal 100 is changed while an application is under an execution, the application executing unit 171 can enable the application executed during a call to be terminated. Therefore, according to exemplary embodiments of the present invention, after the user finishes using the application during a call and holds the mobile terminal 100 close to an ear in order to continue a conversation, the application may be automatically terminated. As a result, after the user uses an application, no additional user input is required to terminate the application because the corresponding application may be automatically terminated while keep providing the call function. Therefore, the user can activate and use a particular function faster and more easily. In addition, according to exemplary embodiments of the present invention, the user can speedily return to a conversation because the activated particular user function may be terminated in accordance with the user's motion for returning to the conversation after using the function.

In accordance with another exemplary embodiment of the present invention, the mobile terminal 100 uses a conversation that is voice-recognized, in addition to sensing information, and executes an application pertaining to the user's need without requiring any search for an application in need and an application selection input. For example, the application executing unit 171 while a call channel is established, can receive a voice signal of the user from an internal or external Microphone (MIC) and control the storage unit 160 to continuously and temporarily store the received voice signal in the stack by a constant amount. The operation of temporarily storing the user's voice signal during a call can be set as a default function. According to exemplary embodiments of the present invention, once the application executing unit 171 analyzes sensing information while the temporary storage function of the voice signal is activated and determines that an orientation state of the mobile terminal 100 is changed, the voice recognition unit 175 can request a voice recognition result of the most recent voice signal. The most recent voice signal should be determined based on a time point when the orientation state of the mobile terminal 100 is changed and should be the voice signal that is continuously and temporarily stored voice signal by the constant amount in the stack. The voice recognition unit 175 is to be explained in details below.

A result of a voice recognition transmitted from the voice recognition unit 175 can be an execution command of a particular application that is a voice signal of the user voice recognized during a call. Accordingly, the application executing unit 171 can refer to mapping information of an application and an execution command and enables an automatic execution of an application associated with a voice recognized execution command. For example, if an execution command, 'memo' is voice recognized from the most recent voice signal, the application executing unit 171 can refer to the mapping information of the application and the execution command and enables a memo application to be automatically executed. Accordingly, a screen for composing a memo can be displayed.

Nonetheless, exemplary embodiments of the present invention are not only applicable or otherwise limited to the memo application. Any applications such as, for example, a phonebook application, a calendar application, a messaging application, an e-mail application, a camera application and other applications provided by the mobile terminal 100 can be automatically executed. Detailed explanation of an exemplary embodiment of the present invention is discussed in a description about the control unit 170 and the flow diagram of FIG. 4.

As described above, the mobile terminal 100 according to exemplary embodiments of the present invention provides an advantageous effect of enabling a variety of applications pertaining to the user's need to be executed, based on the conversation of the user. In addition, after determining a change in an orientation state of the mobile terminal 100, the mobile terminal 100 does not require any additional search for an application and an application selection input for a voice recognition so that the user can immediately use the desired application. Moreover, the mobile terminal 100 performs a voice recognition on the most recent conversation and thus determines or otherwise identifies a desirable function the user wants to use. Therefore, exemplary embodiments of the present invention can precisely determine which function the user wants to use when changing the orientation of the mobile terminal 100. Also, exemplary embodiments of the present invention can reduce an amount of computation required by the mobile terminal 100 by performing a voice recognition on a limited amount of a voice signal that is directly related to an application to be executed. As a result, the user can simply enjoy a desired application with the call function.

As discussed above, according to exemplary embodiments of the present invention, the control unit 170 may include the sensing information collecting unit 173. The sensing information collecting unit 173 collects sensing information by activating the sensing unit 150 at a particular frequency when a call channel is established in response to a request from the application executing unit 171. In addition, the sensing information collecting unit 173 transmits the collected sensing information to the application executing unit 171.

In accordance with another exemplary embodiment of the present invention, the control unit 170 may further include the voice recognition unit 175 such that an application is automatically executed according to a change in an orientation state in the mobile terminal 100 and a voice recognition of a conversation. The voice recognition unit 175 can perform a process of identifying and extracting a word or a series of words from a voice signal of the user that is most recently stored in the stack. Then, the voice recognition unit 175 can compare the voice recognized words with the mapping information of the application and the execution command, search an execution command matching with at least one of the voice recognized words, and transmit the searched execution command to the application executing unit 171.

As described above, the mobile terminal 100 can determine the time point when the user would like to use an application by detecting a change in the orientation state of the mobile terminal 100 while a call channel is established and immediately execute the application. Also, in accordance with another exemplary embodiment of the present invention, the mobile terminal 100 can determine a desired application the user would like to use by performing a voice recognition on the most recent conversation and speedily execute the desired application. Therefore, exemplary embodiments of the present invention enables the user to enjoy a desired application by not requiring any input for selecting an application, after the user has moved and re-arranged the mobile terminal 100 in order to use an application during a call.

Figure 3:
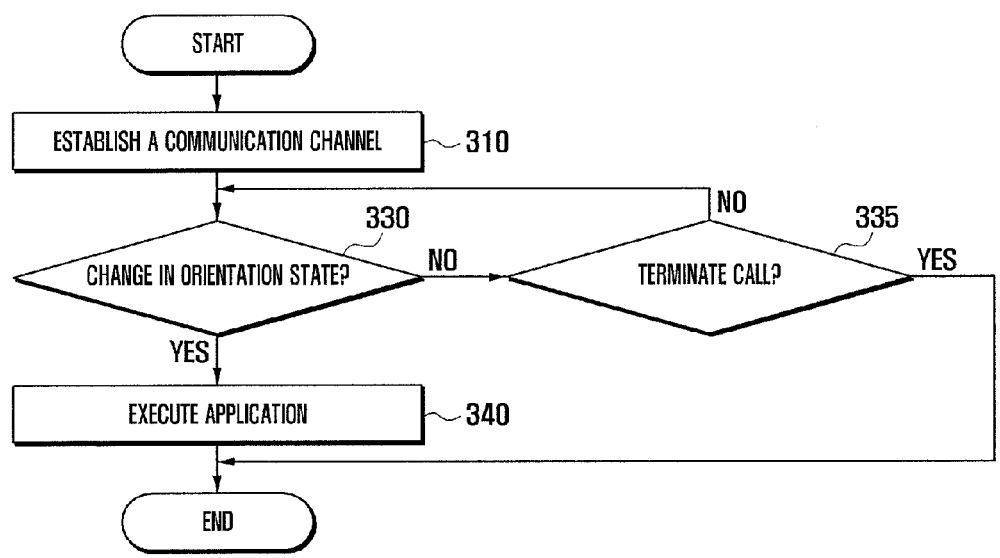
FIG. 3 is a flowchart illustrating a method for executing an application during a call according to an exemplary embodiment of the present invention.

FIG. 3 is a flowchart illustrating a method for executing an application during a call according to an exemplary embodiment of the present invention.

Referring to FIG. 3, in a procedure for executing an application during a call, the control unit 170 controls the RF unit 110 to establish a communication channel in step 310. Further, in step 310, the control unit 170 identifies whether the during-a-call application execution program 161 is set to be executed. Specifically, the control unit 170 can access the storage unit 160 to check the execution setting of the during-a-call application execution program 161. Then, the control unit 170 determines whether an orientation state of the mobile terminal 100 is changed in step 330. For example, in step 330, the control unit 170 determines the change in the orientation state of the mobile terminal 100 based on sensing information transmitted from the sensing unit 150. Further, the control unit 170 can decide a predetermined orientation state of the mobile terminal 100 depending on a type of the communication and determine the change in the orientation state of the mobile terminal 100.

Specifically, the control unit 170 can determine the change in the orientation state of the mobile terminal 100 in step 330, based on the following four communication types. To this end, when the control unit performs in the step 330, the control unit 170 determines the type of the communication and decides the predetermined orientation state of the mobile terminal 100 depending on the communication type. The control unit 170 analyzes the sensing information collected from the sensing unit 150 and determines the current orientation state of the mobile terminal 100. If the current orientation state of the mobile terminal 100 corresponds to the predetermined orientation sate of the mobile terminal 100, then the control unit 170 can determine that the orientation sate of the mobile terminal 100 is changed.

In step 330, the control unit 170 can periodically identify the type of the communication after the communication channel is formed. In particular, the type of the communication can be decided depending on a type of the communication channel established and a type of the Microphone (MIC) used during the call. For categorizing the communication types, the type of the communication channel can be a voice call channel and a video call channel, and the type of the Microphone (MIC) can be an internal Microphone (MIC) equipped within the mobile terminal 100 and an external Microphone (MIC) connected from a microphone jack of the mobile terminal 100. The control unit 170 can identify the type of the microphone by determining the connection state of the microphone jack.

The first type of the communication is a voice call using the internal Microphone (MIC) equipped within the mobile terminal 100. In case of the first type, the control unit 170, in step 330, can decide the state where a distance between the mobile terminal 100 and the user is above a particular value, as the predetermined orientation state. And the control unit 170 can determine whether the current orientation state corresponds to the predetermined orientation state and then determine whether there has been a changed in the orientation state. To this end, the control unit 170 can request sensing information from an illuminance sensor and a proximity sensor of the sensing unit 150. Then, the control unit 170 can analyze the sensing information and if the distance between the user and the mobile terminal 100 is above a particular threshold, determines that the current orientation state of the mobile terminal 100 corresponds to the predetermined orientation state. Accordingly, the control unit 170 can determine that the orientation state of the mobile terminal 100 is changed. Therefore, when the user in the call detaches the mobile terminal 100 from the user's body, the control unit 170 can determine the change of the orientation state of the mobile terminal 100 based on the sensing information.

The second communication type is a video call using the internal Microphone (MIC) equipped within the mobile terminal 100. In this case, the control unit 170, in step 330, can decide the state in which a slope of the mobile terminal 100 is above a particular slope as the predetermined orientation state. Accordingly, the control unit 170 can identify whether the mobile terminal 100 is tilted as much as in the predetermined orientation state and then determine the change in the orientation state of the mobile terminal 100. Specifically, the control unit 170 can request sensing information from a tilt sensor of the sensing unit 150 in order to obtain the slope information. Then, the control unit 170 can analyze the slope information and determine whether the condition of the predetermined state is satisfied. Accordingly, the control unit 170 can determine whether the orientation state of the mobile terminal 100 is changed using the change in the slope of the mobile terminal 100 as a reference, when the user holds up and faces the mobile terminal 100 for the video call and puts down the mobile terminal 100 in order to use an application.

The third communication type is a voice call using the external Microphone(MIC) externally connected to the mobile terminal 100. In case of this communication type, the control unit 170, in step 330, can set the still state maintained for a predetermined time after a movement for a specific duration as a reference for determining the change in the orientation state of the mobile terminal 100. Accordingly, the control unit 170 can determine the change in the orientation state in case the movement state of the mobile terminal 100 is changed to the set state described above. To this end, the control unit 170 can use a combination of sensing information from an illuminance sensor and an accelerometer of the sensing unit 150 and a timer. For instance, when the user holding the mobile terminal 100 in its hand and puts the mobile terminal 100 in front for using an application or when the user takes out the mobile terminal 100 from a bag or a pocket and places the mobile terminal 100 in front of the user for a use, then the control unit 170 can determine that the orientation state of the mobile terminal 100 is changed.

Lastly, the fourth communication type is a video call using the external Microphone (MIC) externally connected to the mobile terminal 100. For this communication type, the control unit 170, in step 330, can determine the change in the orientation state of the mobile terminal 100 similar to the case of the second communication type, by determining the predetermined state based on the slope of the mobile terminal 100.

As such, exemplary embodiments of the present invention can detect the change in the orientation state of the mobile terminal 100 for the use of the application, depending on the communication types described above. Moreover, exemplary embodiments of the present invention can use sensing information and detect when the user tries to use an application program on the mobile terminal 100 during a call.

As described above, when it is determined that the orientation state of the mobile terminal 100 is changed, the control unit 170 automatically executes a predetermined application in step 340. A detailed description of step 340 will be provided below.

On the other hand, when it is determined that the orientation state is not changed, the control unit 170 determines whether to terminate the call in step 335. When it is determined that a request for the call termination is not received, the control unit 170 returns to step 330 and once again determines the change in the orientation state of the mobile terminal 100 during the call. However, when it is determined that the request of the call termination is received, the control unit 170 can process the call termination operation. According to exemplary embodiments of the present invention, at the same time, the control unit 170 terminates the procedure for executing an application during a call as illustrated in FIG. 3.

In step 340, the control unit 170 executes the predetermined application. In step 340, it is preferable that the control unit 170 controls the display unit 140 to display an execution screen of the application. For example, in step 340 the control unit 170 first identifies a list of applications in the storage unit 160. In case a default application is set in the list of applications, the default application can be executed. For example, in case the memo application is set as the default application, the control unit 170 can check the application list and execute the memo application. The memo composition function of the memo application can be executed. Therefore, the control unit 170 controls the display unit 140 to display a screen for composing a memo according to the memo application and to display a symbol or text representing the ongoing call in a specified area of the screen. As another example, the control unit 170 can execute the most favorite application in the application list.

Nevertheless, the predetermined application executed in step 340 is not limited to the memo application. The predetermined application can be any of the phonebook application, the calendar application, the messaging application, the e-mail application, the camera application, and the like. For example, if the predetermined application is the phonebook application, the control unit 170 can enable a screen showing a contact list to be displayed, and if the predetermined application is the calendar application, the control unit 170 can enable daily, weekly, or monthly schedule screen to be displayed. Thus, when the user moves and re-orients the mobile terminal 100 to check a contact or schedule, the corresponding information can be readily confirmed and the user can share the information with the counterparty. Also, if the messaging application or e-mail application is set to be executed, the control unit 170 can enable a message or e-mail received during the call or a list of messages or e-mails to be displayed, and if the camera program is set as the predetermined application, then the control unit 170 can enable a photo-take mode to be activated. Therefore, exemplary embodiments of the present invention allow the user to momentarily and conveniently use the applications without additional control input, but by simply orienting the mobile terminal 100 for the use.

Alternatively, the control unit 170, can further determine an additional application in addition to the predetermined application executed in step 340. The additional application can compensate for any restrictions resulted from executing the predetermined application and the call function at the same time. For example, if the memo application is executed, the additional application can be at least one of a speaker phone application enabling the user to take memo while continuing with the conversation in the call, a voice recording application for in case of the noisy environment or the poor call quality, speech-to-text application to keep the exact record of the conversation, and the like. To this end, in step 340, the control unit 170 may identify mapping information of the additional application and extract a list of the additional applications mapped with the predetermined application. Then, the control unit 170 can control the display unit 140 to display a list the extracted additional applications confirming an execution of any additional applications listed in a pop-up window, which is overlaid on the execution screen of the predetermined application. For example, a pop-up window listing selectable additional applications such as a speaker phone application, a voice recording application, and speech-to-text applications for the memo application. Then the control unit 170 can execute the selected additional application in accordance with the user input and enables the corresponding execution screen of the additional program. Accordingly, exemplary embodiments of the present application can enable the user to seamlessly use the call function and the predetermined application, by executing the additional application in step 340.

When the application(s) is executed in step 340 as described above, the control unit 170 terminates the procedure illustrated in FIG. 3. In accordance with the exemplary embodiment of the present invention, the mobile terminal 100 uses sensing information and executes an application at the moment the user wants to use the application during the call.

In addition, when the orientation state of the mobile terminal 100 is changed while the application is being executed, the procedure for executing an application during a call can additionally enable the executed application to be terminated. Therefore, exemplary embodiments of the present invention allow the user to continue the conversation without manually terminating the executed application, right after finished using the executed application. Alternatively, according to exemplary embodiments of the present invention, depending on a user setting, the control unit 170 can enable the executed application to be continuously running in the background and not terminate the executed application. For example, after the memo application is automatically activated based on the orientation state of the mobile terminal 100 during the call, the control unit 170 may not terminate the memo application and keep the application in an activated sate even if the call is terminated. Accordingly, the user can then readily access the memo application after finishing the call and check the memo composed during the call.

Figure 4:
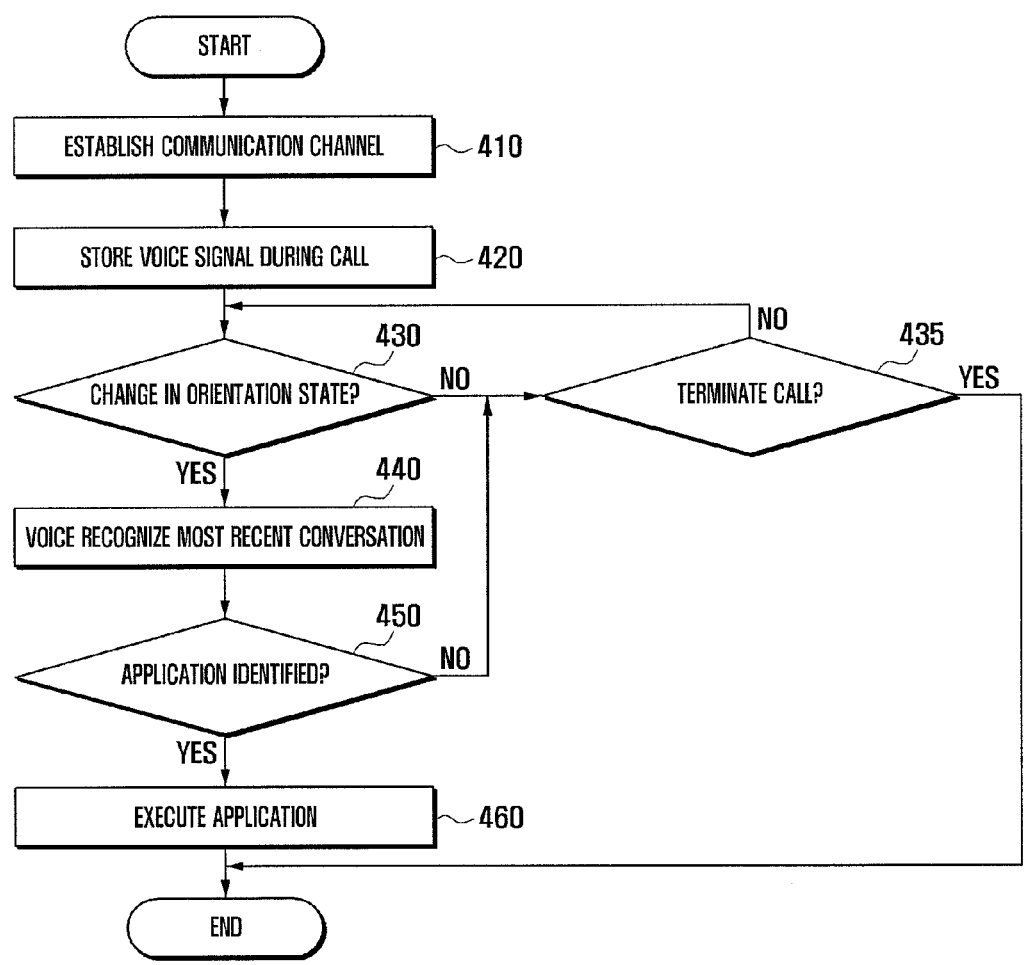
FIG. 4 is a flowchart illustrating a method for executing an application during a call according to an exemplary embodiment of the present invention.

FIG. 4 is a flow chart illustrating a method for executing an application during a call according to an exemplary embodiment of the present invention. In this exemplary embodiment of the present invention, the mobile terminal 100 identifies and executes an application suitable for the user by not only using sensing information, but also by voice-recognizing the call conversation.

Referring to FIG. 4, step 410 of establishing a communication channel, step 430 of determining a change in an orientation state of the mobile terminal 100, and step 435 of determining whether to terminate a call respectively correspond to step 310, 330, and 335 of FIG. 3, respectively. Therefore, detailed descriptions regarding such steps are omitted. The control unit 170 in accordance with this exemplary embodiment of the present invention controls the storage unit 160 to store voice signal of the user during the call. In step 420, the control unit 170 enables the user's voice signal received from either the internal or external Microphone (MIC) to be temporarily stored in a stack by a particular amount. The stack may store continuously store a constant amount of the voice signal in the most recent conversation in the FIFO order. However, the temporary storing of the voice signal supported by the stack may be provided as a default function in the mobile terminal 100.

After step 420, if the mobile terminal 100 determines that there has been a change in the orientation state of the mobile terminal 100 in step 430, the control unit 170 performs a voice-recognition on the voice signal capture during the call, in step 440. The most recent conversation is voice-recognized in this process. As an example, the most recent conversation corresponds to the voice signal that is temporarily stored in the state when the change in the orientation state is determined. In step 440, the control unit 170 accesses the stack of the storage unit 160 and performs a voice recognition to the particular amount of the voice signal temporarily stored when the change in the orientation state is determined. As a result, the function the user would like to use can be determined by voice recognizing only the particular amount of the most recent conversation, with reference to the time the orientation state changed. Therefore, exemplary embodiments of the present invention can detect an appropriate time point for determining when the user changes the orientation of the mobile terminal 100 in order to use a particular function. Also, because limited amount of the voice signal need to be processed, exemplary embodiments of the present invention can minimize the computation amount for the voice recognition.

Then the control unit 170 identifies application to be executed in step 450. The control unit 170 compares words extracted from the voice recognized voice signal and mapping information of an application-to-execution command in the storage unit 160 and searches an execution command that matches at least one of the voice recognized words. Then, the control unit 170 can identify the application related to the searched execution command. For example, if the user wishes to compose a memo during a call, the user would say 'Hold on, let me take a memo' or 'Wait a minute, I will make a note' and then re-orient the mobile terminal 100 so that the display unit 140 is visible within the user's view. In such an example, the execution command mapped with the memo application can be a 'memo', 'note', and the like. As a result, if at least one of the voice recognized words matches with the above execution commands, then the control unit 170 enables the memo application to be executed and activated when the change in the orientation state is detected during the call.

However, according to exemplary embodiments of the present invention, the identified application in step 450 is not limited to the memo application. For example, the identified application may include the phonebook application, the calendar application, the messaging application, the e-mail application, the camera application, and any application that is executed by the mobile terminal 100. For example, if the user wants to check the schedule during the call, the user would say 'Hold on, let me check my schedule' or 'Wait a minute, will take a look at my time table', and the user would then change the orientation state of the mobile terminal 100. In such an example, execution commands mapped with the calendar application can be a 'schedule', 'time table', and the like. In addition, when a pop-up window notifying the received message during the call needs to be displayed or the user would like to send an e-mail to the counterparty to show a picture, a 'text message', a 'picture', a 'photo', an 'e-mail' and the like can be set as execution commands for appropriate applications. As a result, the user, by orienting the mobile terminal 100 to use a particular function during a call, can momentarily use a variety of applications without intentionally providing any selection and/or execution input.

According to exemplary embodiments of the present invention, when none of the voice-recognized words matching the execution command is searched, the control unit 170 proceeds to step 435 and determines whether to terminate the call. Then based on the result of step 435, the control unit 170 either returns to step 430 or terminates the procedure for executing an application during a call. In this exemplary embodiment of the present invention, the control unit 170 may execute the application as in step 340.

On the other hand, when the execution command is searched and the application to be executed is identified in step 450, the control unit 170 enables the application to be executed in step 460.

As a result, the mobile terminal 100 in accordance with this exemplary embodiment of the present invention can determine the application the user wishes to execute while using the call function. Further, the mobile terminal 100 after determining that the orientation state the mobile terminal 100 is changed, does not require any additional selection input for using a specific application and thus, enables the user to readily enjoy the function the user wishes to use. Moreover, in accordance with this exemplary embodiment of the present invention, only a limited amount of voice signal is voice recognized. Thus, the computation amount for the mobile terminal 100 may be reduced. As a result, the mobile terminal 100 can more readily execute the application.

As discussed above, the method and mobile terminal for executing an application during a call can momentarily execute a specific application when desired by the user.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for executing an application during a conversation over a call, the method comprising:
   storing a voice signal during the conversation over the call;
   determining whether an orientation state of a mobile terminal is changed after forming a call channel;
   performing a voice recognition on the stored voice signal, when the orientation state of the mobile terminal is determined to be changed;
   identifying an application corresponding to the voice-recognized voice signal;
   executing the identified application; and
   terminating the identified application when the orientation state of the mobile terminal is determined to be changed while the identified application is executed.

2. The method of claim 1, wherein the storing of the voice signal comprises:
   receiving the voice signal from a microphone; and
   continuously storing a uniform amount of the received voice signal.

3. The method of claim 1, further comprising:
   simultaneously executing at least one additional application with the preset application.

4. The method of claim 1, wherein the determining of the change in the orientation state of the mobile terminal comprises:
   determining a type of the call based on at least one of a type of the call channel and a type of a microphone used in the call;
   determining a preset state based on the type of the call;
   determining a current orientation state of the mobile terminal by analyzing sensing information in accordance with the change in the orientation state; and
   determining that the orientation state is changed when the current orientation state conforms with the preset state.

5. A mobile terminal for supporting an execution of an application during a conversation over a call, the mobile terminal comprising:
   a wireless communication unit configured to form a call channel;
   a microphone configured to collect a voice signal of a user during the conversation over the call;
   a storage unit configured to store the collected voice signal;
   a sensing unit configured to generate sensing information in accordance with a change in an orientation state of the mobile terminal while the call channel is formed;
   a control unit configured to determine whether an orientation state of a mobile terminal is changed after forming a call channel, perform a voice recognition on the stored voice signal, when the orientation state of the mobile terminal is determined to be changed, identify an application corresponding to the voice-recognized voice signal, execute the identified application, and terminate the identified application when the orientation state of the mobile terminal is determined to be changed while the identified application is executed; and
   a display unit configured to display a screen for the executed application.

6. The mobile terminal of claim 5, wherein the storage unit is configured to continuously store a uniform amount of the collected voice signal.

7. The mobile terminal of claim 5, wherein the control unit is configured to control at least one additional application to be simultaneously executed when the identified application is executed.

8. The mobile terminal of claim 5, wherein the control unit is configured to determine, when determining whether the orientation state is changed, a type of the call based on at least one of a type of the call channel and a type of the microphone used in the call; to decide a preset state based on the type of the call, to determine a current orientation state of the mobile terminal by analyzing the sensing information, and to determine that the orientation state is changed when the current orientation state conforms with the preset state.

9. The mobile terminal of claim 8, wherein the control unit is configured:
   to identify the type of the call as one of a voice call using an internal microphone included in the mobile terminal, a video call using an internal microphone included in the mobile terminal, a voice call using an external microphone connected to the mobile terminal, and a video call using an external microphone connected to the mobile terminal; and
   to determine, after allocating a different preset state for each types of the call, that the orientation state of the mobile terminal is changed by comparing the orientation state with the preset state.

* * * * *